US012710539B2

(12) United States Patent
Raci et al.

(10) Patent No.: US 12,710,539 B2
(45) Date of Patent: Aug. 18, 2026

(54) METHOD FOR RECOGNIZING OSCILLATIONS AND/OR DEFLECTION MOVEMENTS OF AN INFRASTRUCTURE COMPONENT

(71) Applicant: Robert Bosch GmbH, Stuttgart (DE)

(72) Inventors: Edonis Raci, Neckarsulm (DE); Evren Divrikli, Abstatt (DE)

(73) Assignee: Robert Bosch GmbH, Stuttgart (DE)

( * ) Notice: Subject to any disclaimer, the term of this patent is extended or adjusted under 35 U.S.C. 154(b) by 656 days.

(21) Appl. No.: 18/341,393

(22) Filed: Jun. 26, 2023

(65) Prior Publication Data

US 2024/0019578 A1 Jan. 18, 2024

(30) Foreign Application Priority Data

Jul. 18, 2022 (DE) ..................... 10 2022 207 294.4

(51) Int. Cl.
*G01S 17/89* (2020.01)
*G01S 7/497* (2006.01)

(52) U.S. Cl.
CPC .............. *G01S 17/89* (2013.01); *G01S 7/497* (2013.01)

(58) Field of Classification Search
CPC .......... G01S 17/89; G01S 7/497; G01S 17/50; G01S 7/4808; G01S 17/88; G06T 7/248
See application file for complete search history.

(56) References Cited

U.S. PATENT DOCUMENTS 11,885,885 B2 * 1/2024 Steinberg ................ G01S 17/86
2018/0284234 A1 * 10/2018 Curatu ................ B60W 60/001
2018/0372874 A1 * 12/2018 Lipson ...................... G01P 5/26
2019/0154836 A1 * 5/2019 Campbell ............. G01S 7/4817
(Continued)

FOREIGN PATENT DOCUMENTS

CN 114424167 A * 4/2022 ............. H04L 67/12
DE 102015205087 A1 9/2016
(Continued)

OTHER PUBLICATIONS

Zhang and Singh: "LOAM: Lidar 0odometry and Mapping in Real-time," Robotics: Science and Systems, (2014), pp. 1-9.

*Primary Examiner* — Tung S Lau
(74) *Attorney, Agent, or Firm* — Norton Rose Fulbright US LLP

(57) ABSTRACT

A method for recognizing oscillations and/or deflection movements of an infrastructure component. The method includes: detecting static and/or geometric features of a first point cloud during initial installation; optionally segmenting the static features of the first point cloud, and generating a first segmented point cloud; further detecting static and/or geometric features of a second point cloud at a later point in time; segmenting the static features of the second point cloud, and generating a second segmented point cloud; superimposing the first point cloud or the first segmented point cloud with the second segmented point cloud; when the first point cloud or the first segmented point cloud is superimposed with the second segmented point cloud, transformation parameters obtained correspond to values of a local oscillation of the infrastructure component and of the at least one LIDAR sensor accommodated therein; and ascertaining an absolute oscillation of the infrastructure component.

11 Claims, 5 Drawing Sheets

(56) References Cited

U.S. PATENT DOCUMENTS

2019/0156150 A1* 5/2019 Krishnan ............. G06V 20/597
2019/0227175 A1* 7/2019 Steinberg ................ G01S 17/89
2022/0334228 A1* 10/2022 Wang ...................... G01S 17/10
2023/0333247 A1* 10/2023 Eichenholz ........... G01S 7/4817
2024/0111051 A1* 4/2024 Gupta .................... G06V 20/52
2024/0264290 A1* 8/2024 Payne ..................... G01S 17/32
2026/0003030 A1* 1/2026 Day ........................ G01S 7/026

FOREIGN PATENT DOCUMENTS

DE 102020118412 A1 3/2021
DE 102020214591 A1 5/2021
EP 1838003 B1 11/2009

* cited by examiner

METHOD FOR RECOGNIZING OSCILLATIONS AND/OR DEFLECTION MOVEMENTS OF AN INFRASTRUCTURE COMPONENT

CROSS REFERENCE

The present application claims the benefit under 35 U.S.C. § 119 of German Patent Application No. DE 10 2022 207 294.4 filed on Jul. 18, 2022, which is expressly incorporated herein by reference in its entirety.

FIELD

The present invention relates to a method for recognizing oscillations and/or deflection movements of an infrastructure component, in particular a transmission tower, a sign gantry, or the like, relative to the surroundings of the infrastructure component, using at least one sensor, in particular a LIDAR sensor. Moreover, the present invention relates to the use of the method for recognizing oscillations and/or deflection movements of an infrastructure component, a device for recognizing oscillations and/or deflection movements of an infrastructure component, and an infrastructure component.

BACKGROUND INFORMATION

German Patent Application No. DE 10 2020 118 412 A1 relates to a security escort system that utilizes data that are generated by a processing subsystem of an automated driving system in order to attain a higher safety integrity level. Sensor fusion processes, among other things, are used for this purpose. In principle, vehicles obtain sensor data, for example, that have been collected by external sensor devices, or data, containing observations or recommendations, that have been generated by other systems, based on sensor data of these sensor devices, and may use these data for the sensor fusion, interference, path planning, and other tasks. The fusion of various types of sensors thus allows, for example, the recognition of objects, the ascertainment of movement paths, or an accurate location determination. In addition, a sensor fusion module may be utilized to control the use and processing of the various sensor inputs, which may be used by machine learning and other modules of the vehicle-internal processing system.

German Patent Application No. DE 10 2020 214 591 A1 provides an on-board vehicle network system that quickly compensates for the failure of sensors or their relaying of information to the surroundings sensor system, using information of other sensor types. With the aid of various linkages and communication paths of the relay units, when there is a loss of function the vehicle surroundings may continue to be recognized by the integrated control unit, based on the sensor information of other sensor types. For this purpose, different types of sensors that make the situation outside the vehicle more precisely recognizable are integrated into the control unit by a sensor fusion functional unit.

European Patent No. EP 1 838 003 B1 provides a wireless base station device and a wireless communication control method, a unit being configured to carry out an oscillation estimation in the propagation environment. Parameters of other units are established based on this estimation.

SUMMARY

The present invention relates to a method for recognizing deflection movements and/or oscillations of an infrastructure component, in particular a transmission tower or a sign gantry, relative to the surroundings of the infrastructure component, using at least one sensor, in particular a LIDAR sensor. According to an example embodiment of the present invention, at least the following method steps are carried out:

a) detecting static and/or geometric features of a first point cloud P1 during initial installation, with the aid of at least one LIDAR sensor of the infrastructure component;

b) optional segmentation of the static features of first point cloud P1 according to a) with the aid of an algorithm, and generation of a first segmented point cloud P1';

c) further detection of static and/or geometric features of a second point cloud P2 at a later point in time than the initial installation, with the aid of the at least one LIDAR sensor of the infrastructure component;

d) segmentation of the static features of the second point cloud P2 according to c) with the aid of an algorithm, and generation of a second segmented point cloud P2';

e) superimposition of first point cloud P1 obtained according to a) or first segmented point cloud P1' obtained according to b) with second segmented point cloud P2' obtained according to d), with the aid of an algorithm;

f) when first point cloud P1 or first segmented point cloud P1' is superimposed with second segmented point cloud P2', transformation parameters T obtained with the aid of the algorithm correspond to values of a local oscillation of the infrastructure component and of the at least one LIDAR sensor accommodated therein; and g) ascertainment of an absolute oscillation of the infrastructure component.

By use of the approach provided according to the present invention, the quality of the data delivered by the at least one LIDAR sensor may be improved to a significant degree. In addition, the data delivered by the sensor that is accommodated at an oscillating infrastructure component are appropriately corrected. Moreover, there is an option for other sensors, which likewise are accommodated at the infrastructure component in question in the form of a transmission tower, to likewise take this information into account for signal improvement. Furthermore, by use of the approach provided according to the present invention, an automatic recalibration option in identifying a continuous rotation is provided.

In one advantageous refinement of the approach provided according to the present invention, first point cloud P1 and/or second point cloud P2 contain(s) the ground, street boundaries, pillars, road signs, traffic lights, sign gantries, and/or roadway boundaries as static and/or geometric features of the surroundings. As static and/or geometric features, first point cloud P1 and/or second point cloud P2 may contain those features that represent a static object, in particular features that are measured and detectable by the sensor.

First point cloud P1 and second point cloud P2 differ in the point in time of their detection. Second point cloud P2 is detected at a later point in time than first point cloud P1. The detection of first point cloud P1 according to a) and the further detection of second point cloud P2 according to c) are temporally separated from one another by preferably 50 milliseconds, more preferably 100 milliseconds or greater. The further detection according to c) follows in particular the detection during initial installation according to a). Steps c) and d) may be repeated at various points in time, and the method according to the present invention may be carried out at the various points in time.

In a further advantageous embodiment of the method provided according to the present invention, according to method step f), for superimposing first point cloud P1 or first segmented point cloud P1' with second segmented point cloud P2', an algorithm is used that is selected from the following group containing, in particular made up of:

- iterative closest point (ICP) algorithm
- normal distribution transform (NDT) algorithm
- neural deformation pyramid (NDP) algorithm
- iterative dual correspondence (IDC)
- probabilistic iterative correspondence (pIC)
- Gaussian fields
- point-based probabilistic registration
- quadratic patches
- likelihood field matching
- conditional random fields (CRFs)
- branch-and-bound registration.

In the method provided according to the present invention, according to d) the segmentation of the static features of second point cloud P2, and optionally according to b) the segmentation of the static features of first point cloud P1, are carried out in particular based on geometric objects, in particular lines, curves, and/or planes. It is advantageous to use these objects, since they are usually measured and are static, i.e., generally not moved by external factors. For the segmentation, which represents a classification into static and dynamic features, all conventional methods are usable, for example neural networks, heuristic algorithms, and a RANSAC algorithm.

In one advantageous refinement of the method provided according to the present invention, according to g) the absolute oscillation of the infrastructure component is ascertained in particular based on its kinematic model. The kinematic model preferably describes the movement of objects. In particular the forces that cause these movements are not taken into account. For example, a vehicle moves at a speed of 0 relative to a coordinate system based on the vehicle, the coordinate origin being situated in the vehicle. However, the vehicle moves relative to a coordinate system outside the vehicle at a speed that is different from 0. The kinematic model facilitates the conversion of this transformation into arbitrary coordinate systems. The kinematic model preferably includes a translatory portion and a rotatory portion.

In one advantageous refinement of the method provided according to the present invention, the ascertained values of the local oscillations and the absolute oscillations of the sensors are added.

In one advantageous refinement of the method provided according to the present invention, after an initial calibration and detection of a second point cloud P2 with the aid of an NDT or ICP algorithm, a decalibration of the sensor is recognized and an autocalibration of the sensor is initiated.

In one advantageous refinement of the method provided according to the present invention, a quality of the autocalibration of the sensors is assessed.

Moreover, the present invention relates to the use of the method for recognizing deflection movements and/or oscillations of an infrastructure component at which at least one sensor, in particular a LIDAR sensor, is accommodated.

Furthermore, the present invention relates to a device for recognizing oscillations and/or deflection movements of an infrastructure component, including an oscillation recognition module and a sensor, in particular a LIDAR sensor, the oscillation recognition module being configured to carry out the method according to the present invention. The oscillation recognition module may be a computer, for example.

Moreover, the present invention relates to an infrastructure component, in particular a transmission tower or a sign gantry, that includes the device according to the present invention, the sensor and optionally the oscillation recognition module being accommodated at the infrastructure component.

The approach provided according to the present invention allows detection of oscillations, rotations, and deflection movements of an infrastructure component, in particular a transmission tower, at which at least one sensor, in particular a LIDAR sensor, is accommodated, and taking into account the data transferred, i.e., previously recorded, by the corresponding sensors, in particular LIDAR sensors. An increase in the signal quality and the signal correctness of the data of the sensor may thus be ensured to a significant degree. In addition, there is the option, using the method provided according to the present invention, to also transfer the relative movements of the infrastructure component to other sensors, so that in the event of relative movements of the transmission tower, for example in heavy wind or strong wind gusts, their data may be used, and likewise utilized there for improving the signal quality. In addition, by use of the method provided according to the present invention, an automatic recalibration option may be provided, which is important, for example, in identifying a continuous rotation of a transmission tower. A continuous rotation or a change in the position of the transmission tower influences the settings that have been made within the scope of an initial calibration, so that by use of the approach provided according to the present invention, a continuous rotation, i.e., a continuous change in the initial location of the sensors in question, may be taken into account.

BRIEF DESCRIPTION OF THE DRAWINGS

The present invention is described in greater detail with reference to the figures.

DETAILED DESCRIPTION OF EXAMPLE EMBODIMENTS

Figure 1:
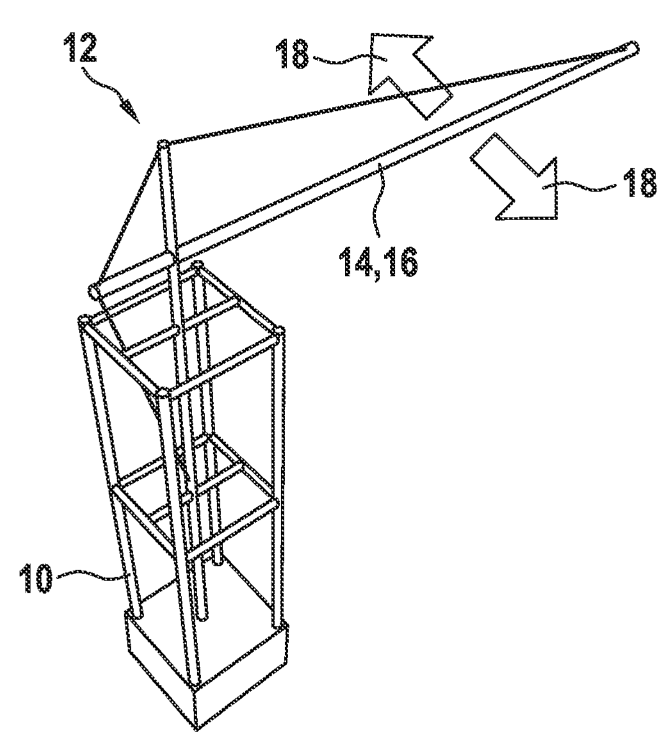
FIG. 1 shows an infrastructure component in the form of a sign gantry including a boom, and its deflection movements.

In the following description of the specific embodiments of the present invention, identical or similar elements are denoted by the same reference numeral, and a repeated description of these elements is dispensed with in individual cases. The subject matter of the present invention is illustrated only schematically in the figures.

A schematic illustration of an infrastructure component 10 in the form of a transmission tower 12 is apparent from FIG. 1. Transmission tower 12 includes a boom 14; the unit made up of transmission tower 12 and boom 14 forms a sign gantry 16, for example. In a strong crosswind, boom 14 of sign gantry 16 illustrated in FIG. 1 carries out deflection movements 18, depending on the wind direction, which influence sensors or cameras fastened to boom 14, which relates to their recording location.

Figure 2:
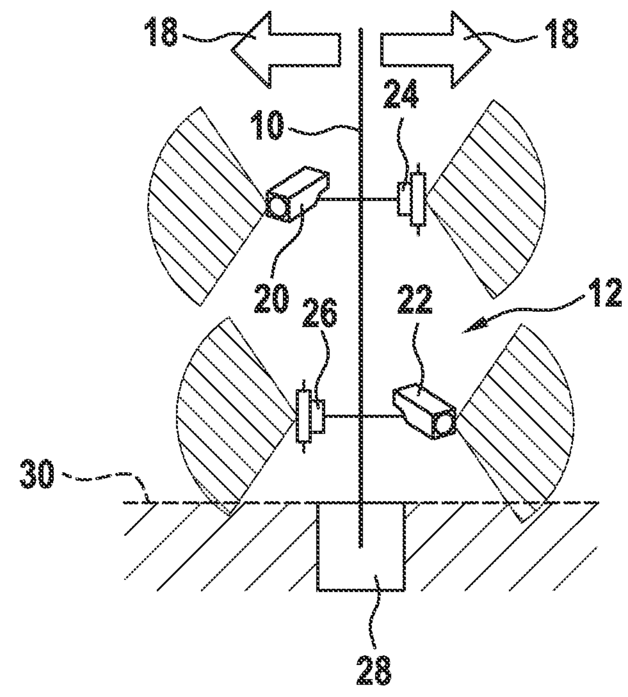
FIG. 2 shows a schematic illustration of an infrastructure component including cameras and LIDAR sensors accommodated at the infrastructure component, according to an example embodiment of the present invention.

FIG. 2 shows an infrastructure component 10, designed as a transmission tower 12 here. Infrastructure component 10 is accommodated in a foundation 28 that is anchored in ground 30. A first camera 20 and a second camera 22, a first LIDAR sensor 24, and at least one further, second LIDAR sensor 26 are accommodated along the vertical extension of infrastructure component 10 designed as a transmission tower 12. If infrastructure component 10, i.e., transmission tower 12, extending essentially in the vertical direction is exposed to strong wind gusts, infrastructure component 10 carries out deflection movements 18 according to the double arrow illustrated at the tip of transmission tower 12 and pointing in opposite directions. At the free end, i.e., at the tip of transmission tower 12, deflection movements 18 carried out by infrastructure component 10 as transmission tower 12 are inherently greater compared to deflection movements 18 carried out by infrastructure component 10 just above ground 30 (cf. FIG. 5 in this regard).

Figure 3:
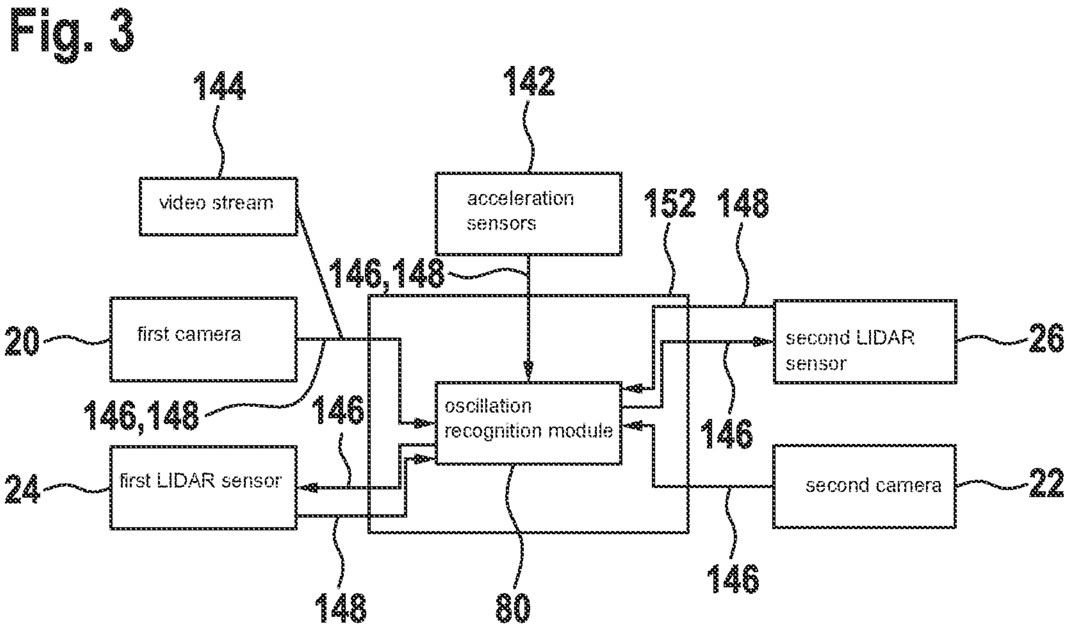
FIG. 3 shows a first schematic overview of an implementation of the method according to an example embodiment of the present invention.

FIG. 3 shows a first schematic overview of an implementation of the method according to the present invention with regard to an infrastructure system 152 that includes an infrastructure component 10. LIDAR sensors 24, 26, which may deliver input information, pass on their data in the form of a position 148 and/or a motion vector 146 to an oscillation recognition module 80. Proceeding solely from LIDAR sensors 24, 26, it is possible to recognize oscillations and/or deflection movements of infrastructure component 10. Additional cameras 20, 22 and sensors such as acceleration sensors 142 may be integrated. In addition, raw data such as a video stream 144 may be used. The result may be passed on by oscillation recognition module 80 to sensors without their own oscillation recognition.

Figure 4:
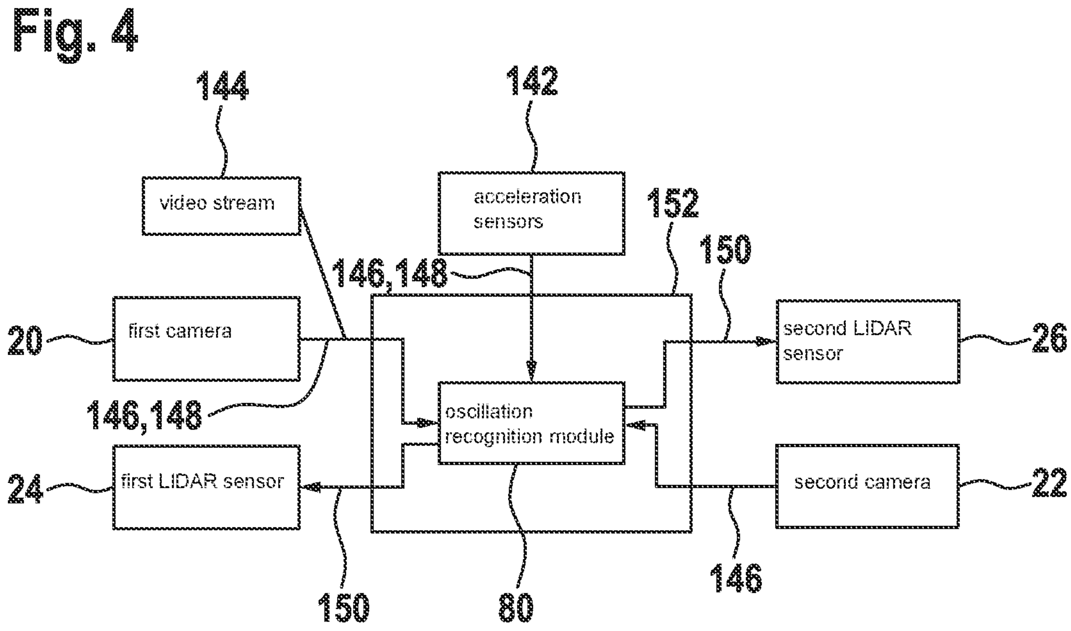
FIG. 4 shows a second schematic overview of an implementation of the method according to an example embodiment of the present invention.

FIG. 4 shows a second schematic overview of an implementation of the method according to the present invention with regard to an infrastructure system 152. The result of oscillation recognition module 80 is output here as a specific function f(x) 150 with regard to the movement for each individual LIDAR sensor 24, 26.

Figure 5:
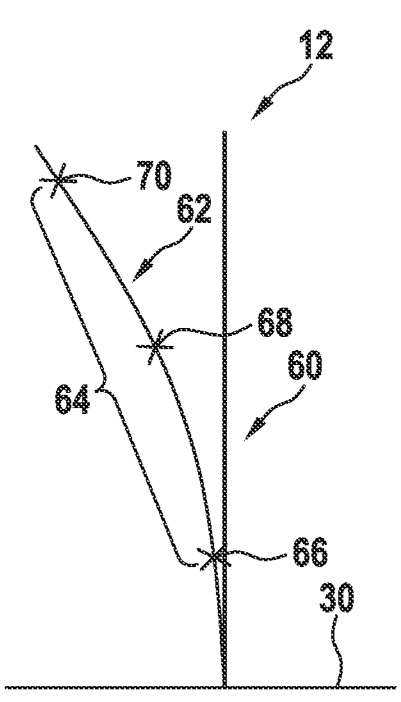
FIG. 5 shows deflection movements of the infrastructure component as a whole, and individual sensor positions for an oscillating infrastructure component.

FIG. 5 shows infrastructure component 10 as transmission tower 12 in a position 60 in which infrastructure component 10 remains in the rest state, i.e., prior to the effect of external influences in the form of strong crosswinds. In this case, infrastructure component 10 designed as transmission tower 12 essentially assumes its straight, vertically extending position.

When a crosswind occurs, infrastructure component 10 in the form of transmission tower 12 assumes a swiveled position 62. In this position, the stated components at infrastructure component 10 in the form of transmission tower 12, for example first camera 20, second camera 22, and the two LIDAR sensors 24, 26, assume specific sensor positions 64. Thus, for example, a location shift in the position of first LIDAR sensor 24 may occur in such a way that it assumes a first sensor position 66 when installed in the lower area of transmission tower 12. In contrast, if first LIDAR sensor 24 is installed higher up, it assumes a second sensor position 68, for example in swiveled position 62 of infrastructure component 10 in the form of transmission tower 12. However, if first LIDAR sensor 24 is installed in the area of the tip of infrastructure component 10, designed as transmission tower 12, first LIDAR sensor 24 assumes a third sensor position 70, for example.

It is apparent from the illustration according to FIG. 5 that components that are accommodated at infrastructure component 10 in the form of transmission tower 12 undergo a significant change in location in swiveled position 62 of transmission tower 12, which inherently has effects on the signal quality of the components that are accommodated, also one on top of the other, at moving infrastructure component 10 in the form of transmission tower 12.

Figure 6:
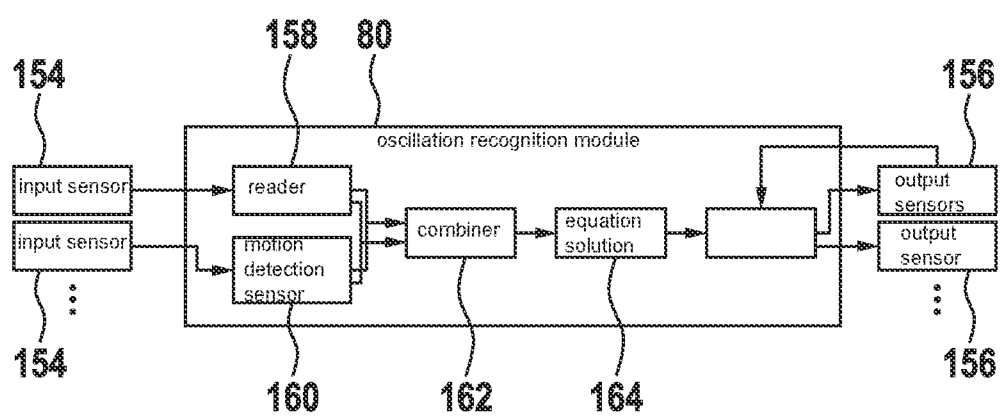
FIG. 6 shows a schematic flowchart of one specific embodiment of the method according to the present invention.

FIG. 6 shows a schematic flowchart of one specific embodiment of the method. Input sensors 154 are present that deliver a preprocessed signal or raw data. The preprocessed signal is read in using a reader 158. Raw data are initially processed using a motion detection system 160. The information of all input sensors 154 is supplied to a combiner 162 and combined, and optionally converted into a shared coordinate system. Equation solution 164 is then carried out. The information is transferred to output sensors 156 via an output interface 166.

Figure 7:
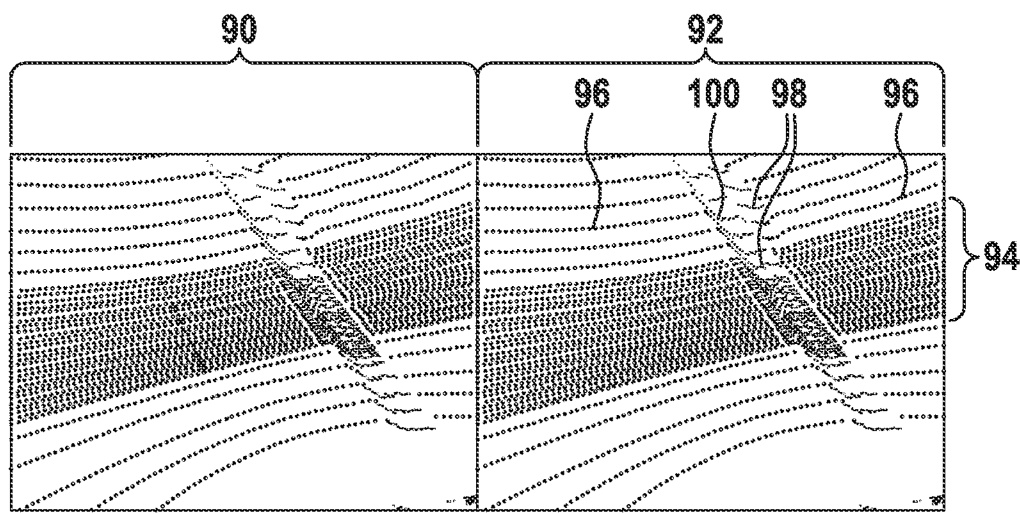
FIG. 7 shows a juxtaposition of first point cloud P1 and first segmented point cloud P1'.

FIG. 7 shows a juxtaposition of a first point cloud P1 90 and a first segmented point cloud P1' 92.

It is apparent from the illustration of first point cloud P1 90 that during the initial installation of first LIDAR sensor 24, for example, at infrastructure component 10 designed as transmission tower 12, this first point cloud P1 90 manually determines static and geometric features 94, 96 of the setting. First LIDAR sensor 24 records the image of first point cloud P1 90, illustrated in FIG. 7. Examples of features, for example relief, pillars, roadway boundaries, and the like, are particularly emphasized in this first point cloud P1 90.

In the present context, "point cloud" is understood to mean the collection of all measurements of first LIDAR sensor 24 after a time T. Depending on the opening angle and resolution, point clouds of differing densities result. The point cloud represents a geometric representation of the surroundings, whose depth is measured. Features 94, 96 of the setting are the stated important features, for example the ground, pillars, roadway boundaries, and the like. These are mounted in the surroundings or fixedly installed there, so that these types of features are also seen by first LIDAR sensor 24. In addition, such features may involve subsequently installed structures, for example at the ceiling of a tunnel, or features that are already present, for example lane markings that are not to be traveled on, or sign gantries.

First point cloud P1 90 illustrated in FIG. 7 is subjected to an algorithm that is capable of segmenting the static points of first point cloud P1 90. First segmented point cloud P1' 92, likewise illustrated in FIG. 7, is also obtained. Static features 94 in the form of ground points or ground waves 98 or roadway boundaries 100 are emphasized in this first segmented point cloud P1' 92.

A comparison of first point cloud P1 90 and first segmented point cloud P1' 92 illustrated next to one another in FIG. 7 shows that point clouds 90, 92 essentially correspond to one another, except that first segmented point cloud P1' 92 has a greater depth of focus.

In accordance with the method provided according to the present invention, an attempt is made, with the aid of an algorithm, in particular an iterative closest point (ICP) algorithm 112, or applying NDT algorithm 114 to the point cloud registration, to superimpose two point clouds, i.e., first point cloud P1 90 or first segmented point cloud P1' 92, and a second segmented point cloud P2'. In this operation, transformation parameters T 140 (cf. FIG. 9) occur between the individual points in the two point clouds P1 90 or P1' 92 and P2' to be superimposed, the transformation parameters representing a value of the level of the local oscillation of infrastructure component 10 in the form of sensor mast 12 at which first LIDAR sensor 24, for example, is accommodated. As is apparent from FIG. 5, in a strong crosswind, this first LIDAR sensor 24, situated in a strictly vertical position during the initial installation, may have assumed either first sensor position 66, second sensor position 68, or even third sensor position 70. Thus, the location of the initial installation or of the initial calibration of first LIDAR sensor 24 is no longer identical to sensor position 66, 68, 70 assumed by deflected first LIDAR sensor 24 in a strong crosswind and with a corresponding influence on infrastructure component 10.

In addition to the above-ascertained local oscillation of infrastructure component 10 in the form of transmission tower 12 and the ascertainment of transformation parameters T 140, besides the local oscillation an absolute oscillation of infrastructure component 10 is computed, whose kinematic model is used to determine the absolute oscillation. The kinematic model of infrastructure component 10 includes a translatory portion and a rotatory portion, and represents a transformation from a reference system of LIDAR sensors 24, 26 to an independent reference system. The values of the transformation are established in particular by calibration, the relationship of LIDAR sensors 24, 26 of infrastructure component 10 to the independent reference system being determined with regard to translation and rotation.

The local change in location of first LIDAR sensor 24, to name one example, is the direct effect of the rotations or deflection movements 18 of infrastructure component 10 in the form of transmission tower 12. This is locally determined using the method provided according to the present invention. The absolute oscillation of infrastructure component 10 in the form of transmission tower 12 is described at the coordinate origin of infrastructure component 10 in the form of transmission tower 12, with the aid of the kinematic model.

Figure 8:
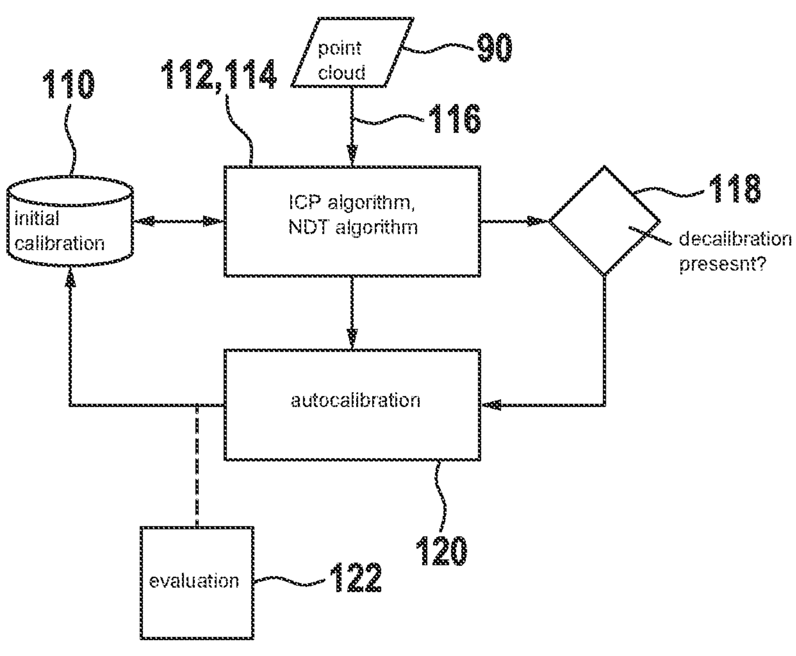
FIG. 8 shows a schematic illustration of the process of the recognition of oscillations/rotations.

FIG. 8 shows a process of the recognitions of deflection movements 18 or rotations of infrastructure component 10 in the form of transmission tower 12.

It is apparent from FIG. 8 that an initial calibration 110 of infrastructure component 10 in the form of transmission tower 12, including first camera 20, second camera 22, first LIDAR sensor 24, and further, second LIDAR sensor 26 accommodated therein, takes place first. First LIDAR sensor 24 carries out, for example, a detection 116 of first point cloud P1 90, as illustrated in the left portion of FIG. 7. Detected first point cloud P1 90 or first segmented point cloud P1' 92 is subjected to either an ICP algorithm 112 or an NDT algorithm 114. Within the scope of the method according to the present invention, transformation parameters T 140 are ascertained which represent the values of the local oscillation of infrastructure component 10, i.e., of transmission tower 12, and thus the local change in location of first LIDAR sensor 24. Based on the absolute value of ascertained transformation parameters T 140, it is checked whether a decalibration 118 of this first LIDAR sensor 24 is present, and if this is the case, an autocalibration 120 is carried out. First LIDAR sensor 24 at infrastructure component 10 in the form of transmission tower 12 is thus realigned. The quality of autocalibration 120 is checked via an evaluation 122.

Figure 9:
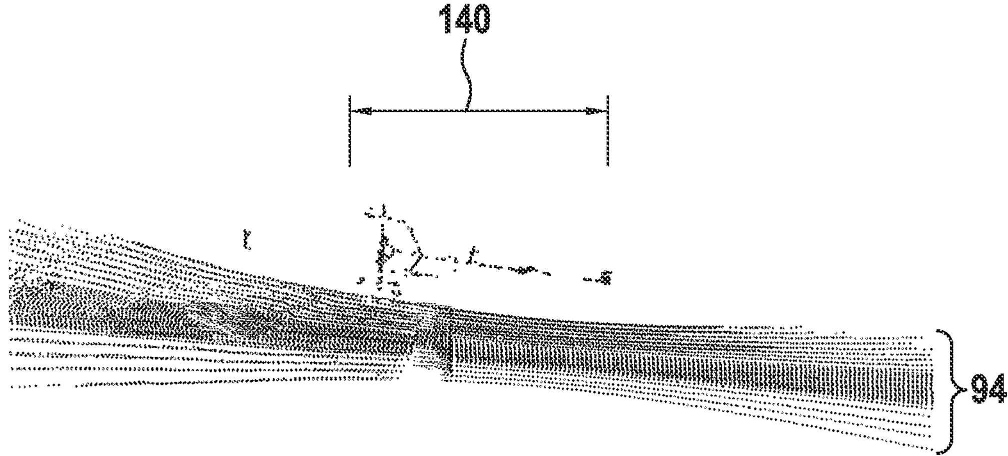
FIG. 9 shows one exemplary embodiment of a decalibration of a sensor system at an infrastructure component in a strong crosswind, according to the present invention.

FIG. 9 shows one exemplary embodiment of a decalibration 118 of the sensor system of an infrastructure component 10 in the form of transmission tower 12 when strong crosswinds occur. Reference numeral 140 denotes a transformation parameter T by which the travel corridor illustrated in first point cloud P1 90 or in first segmented point cloud P1' 92 and in second segmented point cloud P2' has shifted in comparison to these figures. The shift of the schematically discernible travel corridor is to be attributed to the deflection of infrastructure component 10 about its origin, i.e., above ground 30 in a strong crosswind.

A registration of first point cloud P1 90 may take place by use of the algorithms, i.e., with the aid of ICP algorithm 112, NDT algorithm 114, and the NDP algorithm. Two point clouds, i.e., first point cloud P1 90 or first segmented point cloud P1' 92, and second segmented point cloud P2' are compared to one another, and an attempt is made to superimpose them. The ascertainment of transformation parameters T 140 in FIG. 9, and thus also of the relative distance between two LIDAR sensors 24, 26, for example, takes place. According to the method provided according to the present invention, in particular a single sensor, in particular first LIDAR sensor 24, is compared to the initial calibration in order to determine changes in the origin position of first LIDAR sensor 24. The technical advantage is that this procedure may be automated. For example, when NDT algorithm 114 is applied, processing of larger and denser point clouds may be easily carried out.

Autocalibration 120 mentioned in FIG. 8 takes place in such a way that an initial measurement is first made, and at each point in time a check is made as to the value by which the position of first LIDAR sensor 24, for example, has changed. Depending on whether a critical value is exceeded, autocalibration 120 takes place. Algorithms 112, 114 then deliver new translation values and rotation values which generate a new calibration file. The recognition process then takes place anew from the beginning, using the now-valid calibration data.

The present invention is not limited to the exemplary embodiments described here and the aspects highlighted therein. Rather, numerous modifications are possible which are within the scope of activities carried out by those skilled in the art.

What is claimed is:

1. A method for recognizing oscillations and/or deflection movements of an infrastructure component relative to surroundings of the infrastructure component, the infrastructure component accommodating at least one LIDAR sensor and including a transmission tower or a sign gantry, the method comprising the following method steps:

a) detecting static and/or geometric features of a first point cloud during initial installation, using the at least one LIDAR sensor of the infrastructure component;

b) optionally segmenting the static features of the first point cloud from step a) using an algorithm, and generating a first segmented point cloud;

c) further detecting static and/or geometric features of a second point cloud at a later point in time than the initial installation, using the at least one LIDAR sensor of the infrastructure component;
- d) segmenting the static features of the second point cloud from step c) using an algorithm, and generating a second segmented point cloud;
- e) superimposing the first point cloud obtained in step a) or the first segmented point cloud obtained in step b) with the second segmented point cloud obtained in step d), using an algorithm;
- f) when the first point cloud or the first segmented point cloud is superimposed with the second segmented point cloud, transformation parameters obtained using the algorithm correspond to values of a local oscillation of the infrastructure component and of the at least one LIDAR sensor accommodated therein; and
- g) ascertaining an absolute oscillation of the infrastructure component.

2. The method as recited in claim 1, wherein the first point cloud includes the ground and/or roadway boundaries and/or pillars and/or road signs and/or traffic lights and/or sign gantries and/or roadway boundaries as the geometric and/or static features of the surroundings.

3. The method as recited in claim 1, wherein in step f) for superimposing the first point cloud or the first segmented point cloud with the second segmented point cloud, an algorithm is selected from a group including:

an iterative closest point algorithm,
a normal distribution transform (NDT) algorithm,
a neural deformation pyramid (NDP) algorithm,
an iterative dual correspondence (IDC),
a probabilistic iterative correspondence (pIC),
Gaussian fields,
point-based probabilistic registration,
quadratic patches,
likelihood field matching,
conditional random fields (CRFs),
branch-and-bound registration.

4. The method as recited in claim 1, wherein in step b), the segmentation of the static features of the first point cloud is carried out based on geometric objects including lines and/or curves and/or planes.

5. The method as recited in claim 1, wherein in step g), the absolute oscillation of the infrastructure component is ascertained based on its kinematic model.

6. The method as recited in claim 5, wherein the kinematic model includes a translatory portion and a rotatory portion.

7. The method as recited in claim 1, wherein the values of the local oscillations and the absolute oscillations of the infrastructure component and of the LIDAR sensors accommodated at the infrastructure component are added.

8. The method as recited in claim 1, wherein after an initial calibration and detection of the second point cloud using an NDT or ICP algorithm, a decalibration of the at least one LIDAR sensor is recognized and an autocalibration of the at least one LIDAR sensor is initiated.

9. The method as recited in claim 8, wherein a quality of the autocalibration of the at least one LIDAR sensor is assessed.

10. A device for recognizing oscillations and/or deflection movements of an infrastructure component relative to surroundings of the infrastructure component, the infrastructure component accommodating at least one LIDAR sensor and including a transmission tower or a sign gantry, the device comprising:

an oscillation recognition module; and the LIDAR sensor, the oscillation recognition module configured to:
- a) detect static and/or geometric features of a first point cloud during initial installation, using the LIDAR sensor of the infrastructure component;
- b) optionally segment the static features of the first point cloud from a) using an algorithm, and generate a first segmented point cloud;
- c) further detect static and/or geometric features of a second point cloud at a later point in time than the initial installation, using the at least one LIDAR sensor of the infrastructure component;
- d) segment the static features of the second point cloud from c) using an algorithm, and generate a second segmented point cloud;
- e) superimpose the first point cloud obtained in a) or the first segmented point cloud obtained in b) with the second segmented point cloud obtained in d), using an algorithm;
- f) when the first point cloud or the first segmented point cloud is superimposed with the second segmented point cloud, transformation parameters obtained using the algorithm correspond to values of a local oscillation of the infrastructure component and of the at least one LIDAR sensor accommodated therein; and
- g) ascertain an absolute oscillation of the infrastructure component.

11. An infrastructure component, comprising:

a transmission tower or a sign gantry; and a device for recognizing oscillations and/or deflection movements of the infrastructure component relative to surroundings of the infrastructure component, the device including:

an oscillation recognition module, and a LIDAR sensor accommodated at the infrastructure component, wherein the oscillation recognition module configured to:
- a) detect static and/or geometric features of a first point cloud during initial installation, using the LIDAR sensor of the infrastructure component;
- b) optionally segment the static features of the first point cloud from a) using an algorithm, and generate a first segmented point cloud;
- c) further detect static and/or geometric features of a second point cloud at a later point in time than the initial installation, using the at least one LIDAR sensor of the infrastructure component;
- d) segment the static features of the second point cloud from c) using an algorithm, and generate a second segmented point cloud;
- e) superimpose the first point cloud obtained in a) or the first segmented point cloud obtained in b) with the second segmented point cloud obtained in d), using an algorithm;
- f) when the first point cloud or the first segmented point cloud is superimposed with the second segmented point cloud, transformation parameters obtained using the algorithm correspond to values of a local oscillation of the infrastructure component and of the at least one LIDAR sensor accommodated therein; and
- g) ascertain an absolute oscillation of the infrastructure component.

* * * * *